US008107748B2

(12) United States Patent
Miao et al.

(10) Patent No.: US 8,107,748 B2
(45) Date of Patent: Jan. 31, 2012

(54) ADAPTIVE MOTION SEARCH RANGE

(75) Inventors: Zhourong Miao, San Jose, CA (US);
James J. Carrig, San Jose, CA (US);
Marco Paniconi, Campbell, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 1841 days.

(21) Appl. No.: 11/228,656

(22) Filed: Sep. 16, 2005

(65) Prior Publication Data

US 2007/0064803 A1 Mar. 22, 2007

(51) Int. Cl.
G06K 9/36 (2006.01)
G06K 9/46 (2006.01)
H04N 7/12 (2006.01)
H04N 11/02 (2006.01)
H04N 11/04 (2006.01)

(52) U.S. Cl. ... 382/236; 382/232; 382/239; 375/240.02; 375/240.16

(58) Field of Classification Search ............... None
See application file for complete search history.

(56) References Cited

U.S. PATENT DOCUMENTS

| | | | |
|---|---|---|---|
| 4,922,341 A | | 5/1990 | Strobach |
| 5,047,850 A | | 9/1991 | Ishii et al. |
| 5,654,771 A | | 8/1997 | Tekalp |
| 5,872,866 A | | 2/1999 | Strongin et al. |
| 5,903,676 A | * | 5/1999 | Wu et al. .................. 382/244 |
| 5,974,188 A | | 10/1999 | Benthal |
| 6,014,181 A | * | 1/2000 | Sun .............................. 348/699 |
| 6,178,205 B1 | | 1/2001 | Cheung et al. |
| 6,208,692 B1 | | 3/2001 | Song et al. |
| 6,212,235 B1 | | 4/2001 | Nieweglowski et al. |
| 6,466,624 B1 | | 10/2002 | Fogg |
| 6,480,615 B1 | | 11/2002 | Sun et al. |
| 6,480,670 B1 | * | 11/2002 | Hatano et al. .................. 386/329 |
| 6,590,934 B1 | | 7/2003 | Kim |
| 6,591,015 B1 | | 7/2003 | Yasunari et al. |
| 6,608,865 B1 | | 8/2003 | Itoh |
| 6,690,729 B2 | | 2/2004 | Hayashi |
| 6,754,269 B1 | | 6/2004 | Yamaguchi et al. |
| 6,765,965 B1 | | 7/2004 | Hanami et al. |
| 6,782,054 B2 | | 8/2004 | Bellers |
| 6,864,994 B1 | | 3/2005 | Harrington |

(Continued)

FOREIGN PATENT DOCUMENTS

WO   WO 00/16563 A1   3/2000

(Continued)

OTHER PUBLICATIONS

Moscheni et al., "Robust region merging for spatio-temporal segmentation", Image Processing, 1996. Proceedings., International Conference on; vol. 1, pp. 501-504.*

(Continued)

Primary Examiner — Tom Y Lu
Assistant Examiner — Thomas Conway
(74) Attorney, Agent, or Firm — Blakely, Sokoloff, Taylor & Zafman LLP

(57) ABSTRACT

A technique for performing motion estimation using an adaptive motion search range includes calculating motion vectors for blocks of pixels in a target image, using the calculated motion vectors to generate a search range associated with a target block of pixels in the target image, and using the generated search range to estimate motion of the target block of pixels.

21 Claims, 6 Drawing Sheets

U.S. PATENT DOCUMENTS

| | | | |
|---|---|---|---|
| 7,110,455 B2 * | 9/2006 | Wu et al. | 375/240.16 |
| 7,809,063 B2 * | 10/2010 | Lin | 375/240.16 |
| 2003/0142749 A1 | 7/2003 | Hong | |
| 2004/0057517 A1 | 3/2004 | Wells | |
| 2004/0062307 A1 | 4/2004 | Hallapuro et al. | |
| 2004/0131267 A1 | 7/2004 | Adiletta et al. | |
| 2004/0233991 A1 | 11/2004 | Sugimoto et al. | |
| 2005/0100092 A1 | 5/2005 | Sekiguchi et al. | |
| 2005/0135483 A1 | 6/2005 | Nair | |

FOREIGN PATENT DOCUMENTS

| | | |
|---|---|---|
| WO | WO 01/78402 A1 | 10/2001 |
| WO | WO 02/37859 A2 | 5/2002 |
| WO | WO 2004/047454 A1 | 6/2004 |
| WO | WO 2005/069629 A1 | 7/2005 |

OTHER PUBLICATIONS

Wang et al. ("Spatio-temporal segmentation of video data", MIT Media Lab Vision and Modeling Group, Tech Report No. 262, 1994, pp. 1-12).*

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

* cited by examiner

TARGET PICTURE

US 8,107,748 B2

ADAPTIVE MOTION SEARCH RANGE

FIELD OF INVENTION

The invention is related to the field of video compression.

BACKGROUND

High compression gains for video sequences can be achieved by removing temporal redundancies between images (frames). For example, to encode an image, a temporal prediction of the image to be encoded is generated based on previously encoded images. The temporal prediction is compared with the actual image to determine the prediction error, and the prediction error is encoded. The prediction can be made using block-based motion estimation and compensation methods, which are widely used (e.g., MPEG standards).

Motion compensation and estimation methods are used to find a reference block in one or more reference images to predict the location of a corresponding target block in the target image, so that only the prediction residual of the target block needs to be coded, which is typically the prediction error and the motion vector. These methods perform block matching to identify a reference block of pixels in the reference image that is most similar to a corresponding target block in the target image.

The pixel distance between the reference block and corresponding target block is the motion vector for the target block. For example, let $mx_{i,j}$, $my_{i,j}$ be the motion vector of a block $B_{i,j}$ at the x-axis (horizontal) and y-axis (vertical), respectively. The values of the motion vector are used in video compression, along with the reference block, to generate a prediction value for the target block.

FIG. 1 is a diagrammatic view of an illustrative motion vector. Target image 120 is to be encoded using information from reference image 110. Reference block 115 is identified as the block in reference image 110 that most closely matches a target block 125 in target image 120. After the reference block is identified, motion vector 130 (shown as an arrow for illustrative purposes only) is generated to identify the position of target block 125 relative to the position of reference block 115. Motion vector 130 has two elements that represent the relationship between reference block 115 and target block 125: a horizontal displacement and a vertical displacement. For example, reference block 115, which is an illustrative 3×3 group of pixels, is at location (i', j'), and target block 125 is at location (i,j). The distance between the two blocks is the motion vector (i'-i,j'-j).

To identify the reference block in the reference image, candidate blocks in the reference image are compared to the target block. Each candidate block has the same size as the target block and is located within a specified search range in the reference image. The candidate block that most closely matches the target block is identified as the reference block. Searching for the reference block is a significant part of motion estimation and usually requires a large amount of arithmetic computation.

The complexity of performing motion estimation for one target block is proportional to the number of possible reference blocks within the search range, which is proportional to the square of the motion search range, or distance d, e.g., Complexity=$\alpha \times d^2$, where $\alpha$ is a constant. The motion search range defines the area in the reference image that is used to find the reference block. In other words, the search range specifies the number of blocks in the reference image to be examined during motion estimation.

The motion search range should be related to the speed of the movement of the object in the image. For example, for fast moving objects, a large search range is appropriate to find a good counter-block to predict the target block. However, predicting which part of the image (or frame) has a small amount of motion and which part has a large amount of motion is difficult if done before performing the motion estimation method. Therefore, typical video compression methods use a fixed motion search range for all the blocks in the same target image.

The drawback of a fixed motion search range is that if it is large enough to capture the fastest moving object in the image, it unnecessarily increases the search computation for the regions with small movement. Conversely, if the search range is too small, the motion estimation method may not be able to find the reference block which has a large amount of movement, because the reference block may be outside of the search range.

SUMMARY

A technique for performing motion estimation using an adaptive motion search range includes calculating motion vectors for blocks of pixels in a target image, using the calculated motion vectors to generate a search range associated with a target block of pixels in the target image, and using the generated search range to estimate motion of the target block of pixels.

BRIEF DESCRIPTION OF THE DRAWINGS

The present invention is illustrated by way of example and may be better understood by referring to the following description in conjunction with the accompanying drawings, in which.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field, frame, image, or picture that are used to describe the various embodiments are generally interchangeable as used with reference to video data.

A method to adapt a motion search range is used in motion estimation to automatically adjust a motion search range of a target block based on existing information about motion in the target image. This method can both reduce the search range for slow motion objects and also preserve the prediction quality of fast moving objects by automatically increasing the motion search range for the fast moving objects. For example, the method adaptively adjusts the motion search range for a target block according to motion estimate results previously calculated for neighboring blocks. Therefore, embodiments of this method reduce the complexity of finding motion vectors for each target block by adapting the motion search range to the amount of motion in the surrounding region. The adaptive method can be combined with other techniques to perform temporal prediction in video compression methods. The adaptive method can also be used in other video applications where motion estimation is needed.

Figure 1:
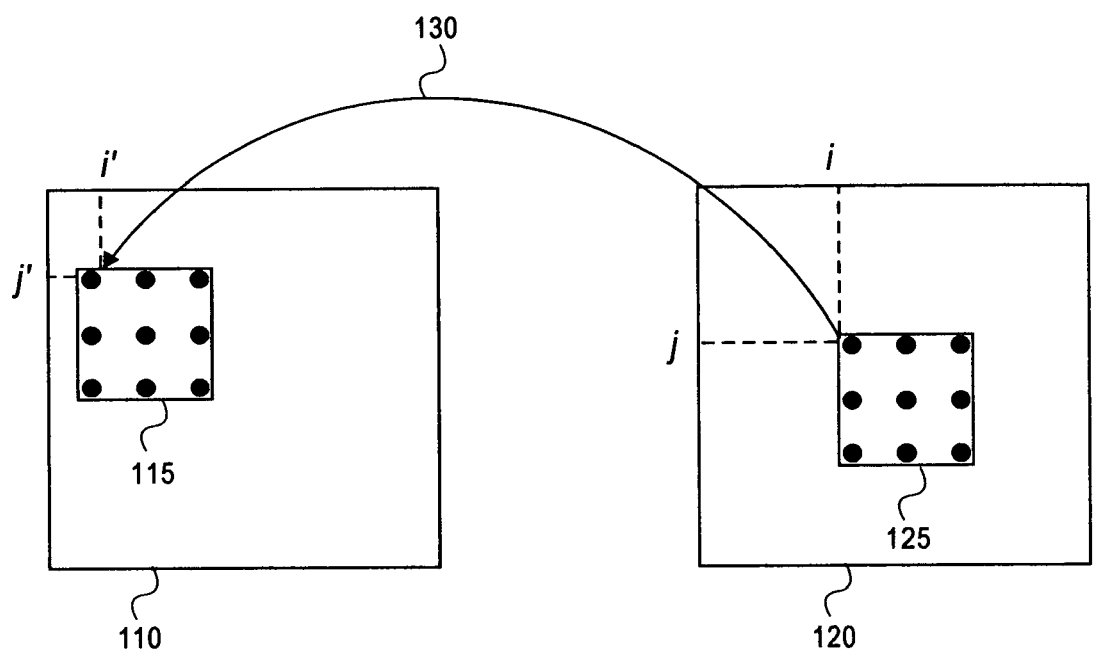
FIG. 1 shows an example of a motion vector for a target block generated based on a reference block.
Figure 2:
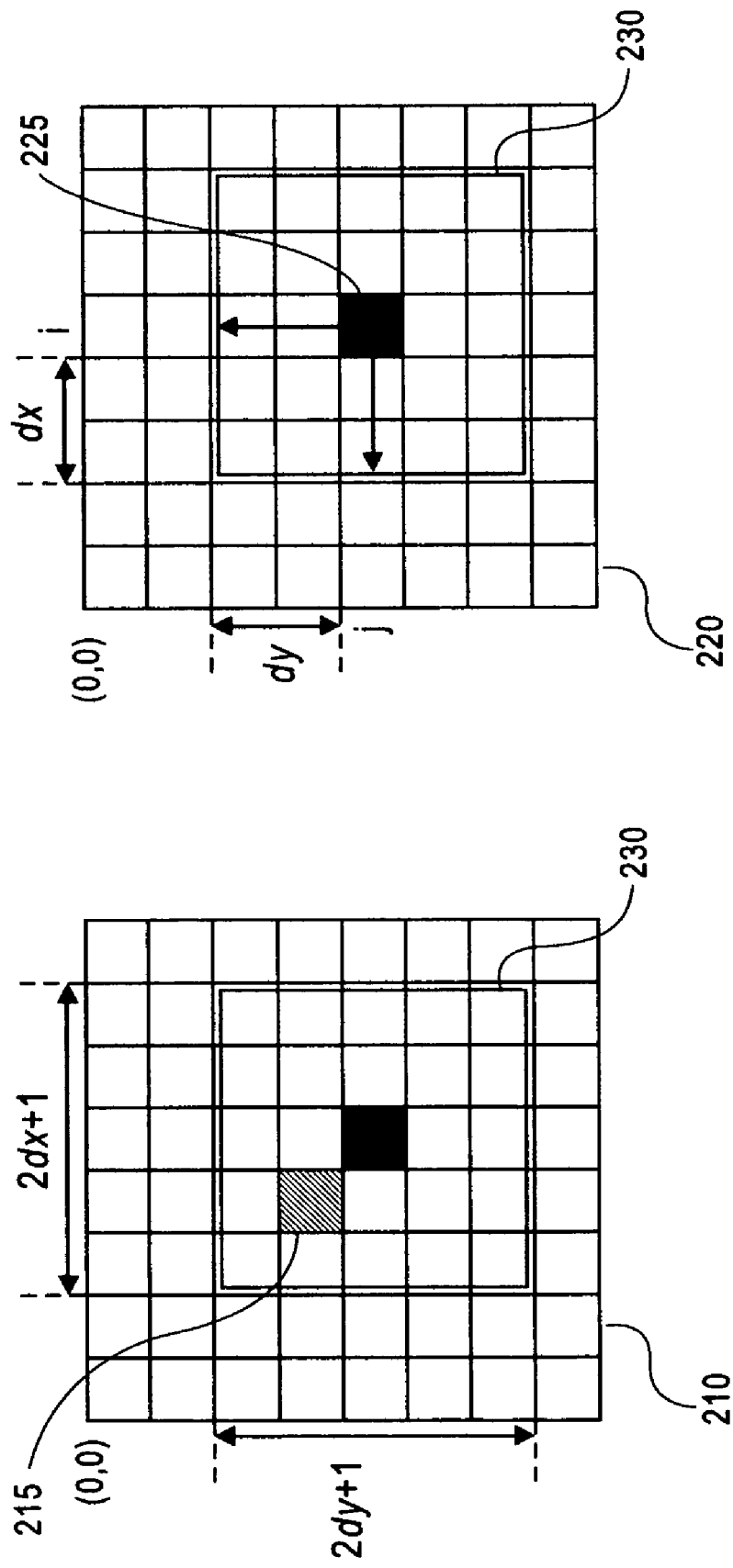
FIG. 2 shows an example of an adaptable motion search range for performing motion estimation in video sequences.

FIG. 2 shows an example of a motion search range that is determined using an adaptive method. Let $B_{i,j}$ be a target block 225 in the target image 220 at pixel position i,j. Here, $dx_{i,j}$ and $dy_{i,j}$ are the horizontal and vertical motion search ranges, respectively. In this example, the candidate reference blocks in the reference image 210 are within the rectangular area 230 of $[2dx_{i,j}+1] \times [2dy_{i,j}+1]$, which contains the number of candidate blocks to be compared to the target block in order to find reference block 215. This search range has a direct impact on the computational complexity of performing motion estimation. By adaptively adjusting the values of $dx_{i,j}$ and $dy_{i,j}$ for a target block based on a predicted amount of motion in neighboring blocks, the size of the search range can be reduced if the neighboring blocks are predicted to have a low amount of motion. The resulting smaller search range reduces the computational complexity of performing motion estimation in the target block. Similarly, in some embodiments, if neighboring blocks are predicted to have a large amount of motion, the search range can be adapted to be relatively larger.

In general, $N_x$, $N_y$ is the maximum horizontal and vertical search range of the target block. The search ranges $dx_{i,j}$, $dy_{i,j}$ are adjustable search ranges for a given target block, $B_{i,j}$, that are calculated using previously calculated motion vectors from neighboring blocks. The neighboring blocks that have had their motion estimates previously calculated are called preceding neighboring blocks, because their motion estimates were determined before the motion estimate of the target block. This process automatically adapts the size of the search range for a particular target block using previously calculated motion estimates from neighboring blocks, rather than using fixed values (e.g., $N_x$, $N_y$) for the search range.

Figure 3:
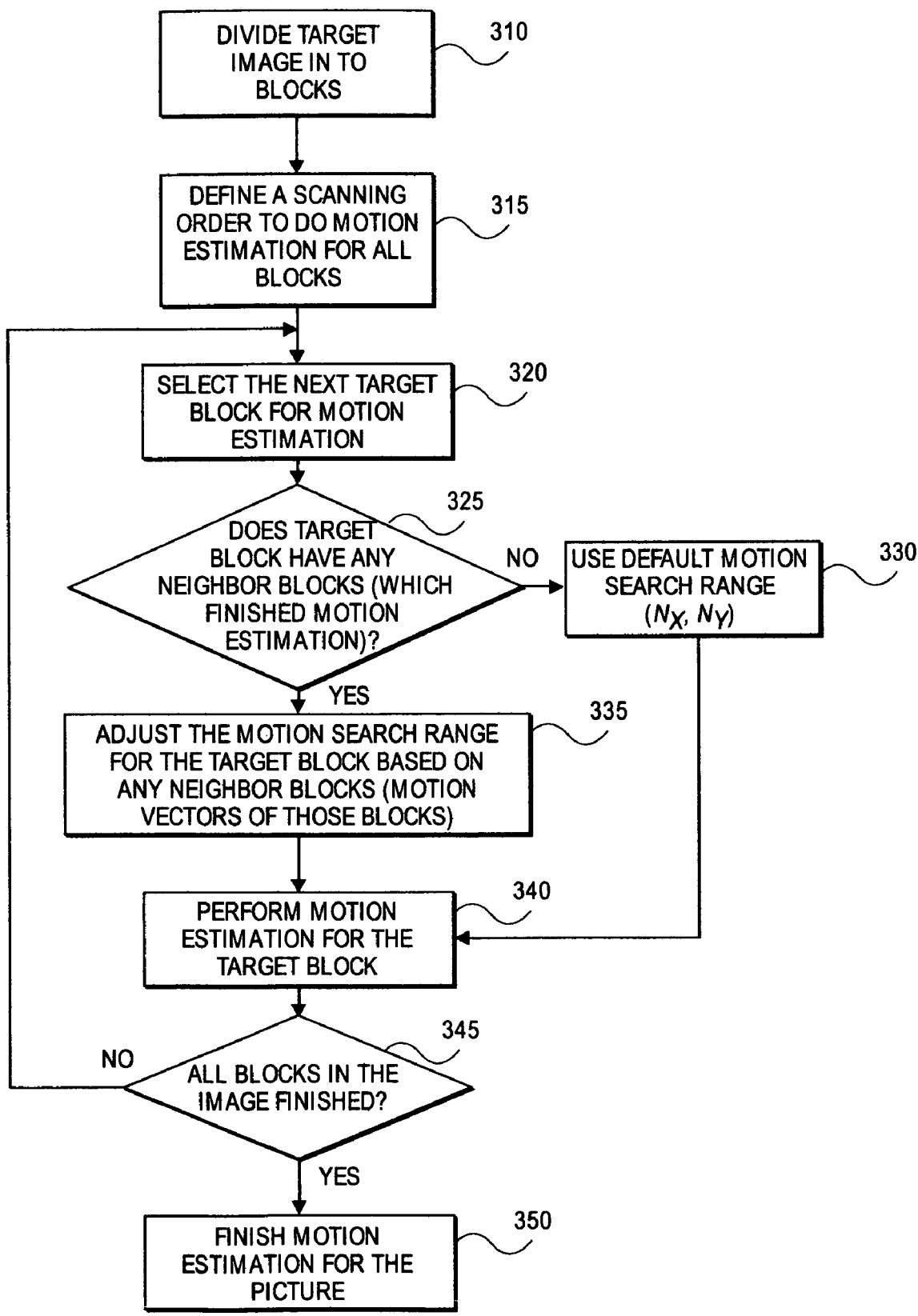
FIG. 3 shows an example of a method to adapt a motion search range for blocks used in performing motion estimation.

The values of $dr_{i,j}$ and $dy_{i,j}$ that define the motion search range as shown illustratively in FIG. 2 are automatically adapted to each block in the target image using the illustrative method shown in FIG. 3. At 310, the target image is divided into blocks. At 315, a scanning order for sequentially performing motion estimation on the blocks is defined. At 320, a target block is selected for motion estimation processing. At 325, the process determines whether the target block has enough preceding neighboring blocks (which are neighboring blocks with determined motion vectors) to adapt the search range. If not, then, at 330, the process performs motion estimation on the target block using a default search range. For example, the initial block in the scanning order sequence, such as block $B_{0,0}$ at the upper-left corner of the target image in FIG. 2, has no preceding neighboring blocks in an encoding process. In this case, the search range parameters of the motion estimation method can be set to default values of: $dx_{i,j}=N_x$ and $dy_{i,j}=N_y$ for this initial block in the sequence. Motion estimation is then performed on the target block, 340.

In some embodiments, a single preceding target block with a determined motion vector (e.g., upper left-hand block) is sufficient to begin the adaptive search range method. In other embodiments, multiple preceding target blocks with determined motion vectors are required (e.g., upper and left-hand neighboring blocks if a raster scanning order is used). At 335, for the target blocks that have sufficient preceding neighboring blocks, the process computes adjustment factors from the preceding neighboring blocks. The search range for the target block is automatically adapted to the amount of motion in the preceding neighboring blocks using the adjustment factors, and motion estimation is performed for the target block using the adapted search range at 340. At 345, the process determines if motion estimation is to be performed on other blocks. If it is, the method returns to 320. Otherwise, at 350 the process ends.

The following is a description of illustrative embodiments associated with FIG. 3. In one instance, the search range for a target block is adjusted in 335 of the motion estimation method shown in FIG. 3 based on factors calculated from preceding neighboring blocks. These factors are:

$$dx_{i,j} = \widehat{mx}_{i,j} + \delta_x; \quad dy_{i,j} = \widehat{my}_{i,j} + \delta_y. \tag{1}$$

where $\widehat{mx}_{i,j}$, $\widehat{my}_{i,j}$ are the estimated horizontal and vertical motion ranges for the target block $B_{i,j}$, and $\delta_x$, $\delta_y$ represent an estimated amount of correlation between the amount of motion in the preceding neighboring blocks and the amount of motion in the target block. The concept behind eq. (1) is that the motion of pixels in a target block is likely to be similar to the pixel motion in neighboring blocks. Therefore, the motion search range for a particular target block is automatically determined from the amount of motion that has already been found in its neighboring blocks, as indicated by the neighboring motion vectors.

Estimating the Motion Range for the Target Block

The values for the motion search range, $\widehat{mx}_{i,j}$ and $\widehat{my}_{i,j}$ for the target block are computed from the motion vectors of its preceding neighboring blocks. If set $P_{i,j}$ is defined as the set of preceding neighboring blocks of target block $B_{i,j}$, then $\widehat{mx}_{i,j}$ and $\widehat{my}_{i,j}$ are expressed as a function of the motion vectors of the preceding neighboring blocks in the set $P_{i,j}$. In one embodiment, the function is the average value of the motion vectors of the blocks belonging to the set $P_{i,j}$, which is:

$$\hat{mx}_{i,j} = \frac{1}{n} \sum_{B_{k,l} \in P_{i,j}} mx_{k,l}, \quad \hat{my}_{i,j} = \frac{1}{n} \sum_{B_{k,l} \in P_{i,j}} my_{k,l},$$

where $B_{k,l} \in P_{i,j}$ denotes the blocks in the set of $P_{i,j}$, and n is the total number of blocks in $P_{i,j}$. In this example, if two blocks, such as the upper block and the left block, are preceding neighboring blocks, then $\widehat{mx}_{i,j}$ and $\widehat{my}_{i,j}$ are expressed as the average of two motion vectors:

$$\widehat{mx}_{i,j} = (mx_{i-1,j} + mx_{i,j-1})/2, \quad \widehat{my}_{i,j} = (my_{i-1,j} + my_{i,j-1})/2. \tag{3}$$

The function to generate $\widehat{mx}_{i,j}$ and $\widehat{my}_{i,j}$ is therefore determined from the motion vectors of the blocks in the set $P_{i,j}$. With this function, the adaptive motion search range method dynamically determines a motion search range for each block in a target image. The method, in one embodiment, uses eq. (3) to adapt the search range for a target block by estimating the amount of motion of an object in the target block using information about the amount of motion in its neighboring blocks.

For example, if a target block has preceding neighboring blocks with small motion vectors, then, generally, the target block has a small amount of motion. The adaptive motion search range method in one embodiment uses eq. (3) to generate a small search range for the target block, an action which reduces the complexity of the motion search.

On the other hand, if a target block has preceding neighboring blocks with large motion vectors, then the target block probably has a large amount of motion. Therefore, the adaptive motion search range method, in one embodiment, uses eq. (3) to automatically increase the search range for the target block. Motion estimation is then performed for the target block with an increased search range that is large enough to identify a reference block for a fast-moving object.

Eqs. (2) and (3) are examples of functions that can be used to calculate the average value of the motion vectors in the set $P_{i,j}$. A more general function can be obtained by applying a filter to the motion vectors in the set of preceding neighboring blocks $P_{i,j}$ to generate the estimated motion range $\widehat{mx}_{i,j}$ and $\widehat{my}_{i,j}$. Without loss of generality, examples are shown for deriving item $\widehat{mx}_{i,j}$, and item $\widehat{my}_{i,j}$ can be derived from the same procedures. Let L be the filter which contains n taps, $L=[l_1, l_2, \ldots, l_n]$, where $l_i$ is the i-th element in L, and $l_i$ is also the filter coefficient of tap i. Let $M_x$ be the vector containing all motion vectors (x-axis values only) of the blocks in the preceding neighboring blocks $(P_{i,j})$, $M_x=[x_1, x_2, \ldots, x_n]$. Then:

$$\widehat{mx}_{i,j}=L\times(M_x)^T, \widehat{my}_{i,j}=L\times(M_y)^T, \quad (4)$$

where $(M_x)^T$ is the transpose of vector $M_x$.

The averaging method shown in eqs. (2) and (3) are special cases of the filtering method of eq. (4). For example, if $L=[0.5,0.5]$, $M_x=[mx_{i-1,j},mx_{i,j-1}]$ and $M_y=[my_{i-1,j},my_{i,j-1}]$, then eq. (4) is reduced to eq. (3).

In general, the number of taps in filter L can be increased by increasing the number of blocks in the set of $P_{i,j}$, because the number of blocks in $P_{i,j}$ is equal to the number of taps in L.

Usually, L can be a low pass filter (smoothing filter), which is used to obtain the statistical average value of the preceding neighboring block motion vectors. Many methods can be used to design such a filter (e.g., select the value for each filter coefficients ($l_i$) in filter L). The adaptive motion search range method can then use the low-pass filter to obtain the estimated search range $\widehat{mx}_{i,j}$ and $\widehat{my}_{i,j}$.

Estimating a Margin of Safety for the Adjusted Search Range

The values for adjustment items $\delta_x$ and $\delta_y$ in eq. (1) can be used as a safety margin for adjusting the motion search range, so as to account for the possibility that the motion vectors of the preceding neighboring blocks fail to anticipate an amount of motion in the target block. For example, if the preceding neighboring blocks motion vector distribution results in a large standard deviation, then the adjustment values $\delta_x$ and $\delta_x$ allow the motion search range for the target block to be significantly different from that of its preceding neighboring blocks.

The selection of values for $\delta_x$ and $\delta_x$ allows the motion search range to adapt to the motion characteristics of the target block. Larger $\delta_x$ and $\delta_x$ values allow faster moving objects in the motion search range to be detected. However, larger values can increase the motion search complexity, because the search range is increased. Smaller $\delta_x$ and $\delta_x$ limit the speed of adaptation while reducing the complexity of the motion search. The items $\delta_x$ and $\delta_y$ can have either fixed or adjustable values. Using fixed values has simplicity. Using adaptive values for $\delta_x$ and $\delta_y$ can improve the accuracy of the motion estimation.

There are various methods that can adapt $\delta_x$ and $\delta_y$ to the motion characteristics of the target block. In general, the values for $\delta_x$ and $\delta_y$ should be large if the target block is likely to have a motion vector that differs from those of its preceding neighboring blocks. Without loss of generality, examples are shown for deriving item $\delta_x$ (item $\delta_y$ can be derived from the same procedures).

The first example uses the standard deviation of the motion vectors of preceding neighboring blocks to derive $\delta_x$. For example, for target block $B_{i,j}$, $$\delta_x = k\left[\frac{1}{n}\sum_{B_{k,l}\in P_{i,j}}(mx_{k,l}-\widehat{mx}_{i,j})^2\right]^{\frac{1}{2}}, \quad (5)$$

$$\delta_y = k\left[\frac{1}{n}\sum_{B_{k,l}\in P_{i,j}}(my_{k,l}-\widehat{my}_{i,j})^2\right]^{\frac{1}{2}},$$

where $B_{k,l}\in P_{i,j}$ denotes all the blocks in the set of $P_{i,j}$, n is the total number of blocks in $P_{i,j}$, $\widehat{mx}_{i,j}$ is the estimated motion range of target block $B_{i,j}$ (which can be derived from eq. (4)), and k is a constant scalar.

The second example filters over the motion vectors of preceding neighboring blocks to determine $\delta_x$. Similar to the method of calculating the motion search range using eq. (4), a general method to obtain $\delta_x$ and $\delta_y$ applies a filter over the preceding motion vectors of the target block $B_{i,j}$. This filter is usually is a high pass filter, denoted as H.

Let H be a filter which contains n taps, $H=[h_1, h_2, \ldots, h_n]$. Then:

$$\delta_x=|H\times(M_x)^T|, \delta_y=|H\times(M_y)^T|, \quad (6)$$

where |a| denotes the absolute value of a. Vectors $M_x$ and $M_y$ have the same definition as that given in eq. (4). The high pass filter H is related to the variance of $M_x$ (the motion vector values of preceding neighboring blocks). Therefore, when $\delta_x$ is large, the preceding motion vectors have a large variance and vice versa.

For example, if the set of preceding neighboring blocks has two blocks (e.g., upper and left), the high pass filter is $H=[0.5,-0.5]$, $M_x=[mx_{i-1,j},mx_{i,j-1}]$ and $M_y=[my_{i-1,j}, my_{i,j-1}]$, then $$\delta_x=|mx_{i-1,j}-mx_{i,j-1}|/2, \delta_x=|mx_{i-1,j}-mx_{i,j-1}|/2. \quad (7)$$

In some embodiments, more taps can be used by increasing the number of preceding neighboring blocks.

Extension to Multiple Reference Images

The illustrative examples described above are based on a single reference image. In some embodiments, the process is extended to cases in which multiple reference images are used for motion estimation, e.g., a target block can be predicted from different images. In these cases, a motion vector has three elements, e.g., $[mx_{i,j}, my_{i,j}, mt_{i,j}]$, where $mt_{i,j}$ is the time index of a particular reference image.

In the single reference image case, the preceding neighboring blocks exist in the same reference image, e.g., they are in a two-dimensional surface. With multiple reference images, the scope of preceding neighboring blocks extends to three-dimensions, e.g., in different images, as long as their motion estimates are determined before the motion estimate of the target block. Then the filtering methods to obtain $\widehat{mx}_{i,j}, \widehat{my}_{i,j}$ and $\delta_x, \delta_y$ can be applied to the three-dimensional, multiple reference case immediately, as long as the filters (L and H) are constructed according to the distribution of the preceding neighboring blocks.

Selecting a Block Scanning Order

The block scanning order, which establishes the sequence of performing motion estimation for each block, determines the set of blocks that can be the preceding blocks for a particular target block, i.e., only the blocks for which motion estimation has been calculated earlier than target block can be preceding blocks of the target block. Therefore, the type of block scanning order that is used by the adaptive motion search range method has an effect on the estimated motion search range for a particular target block.

Figure 4:
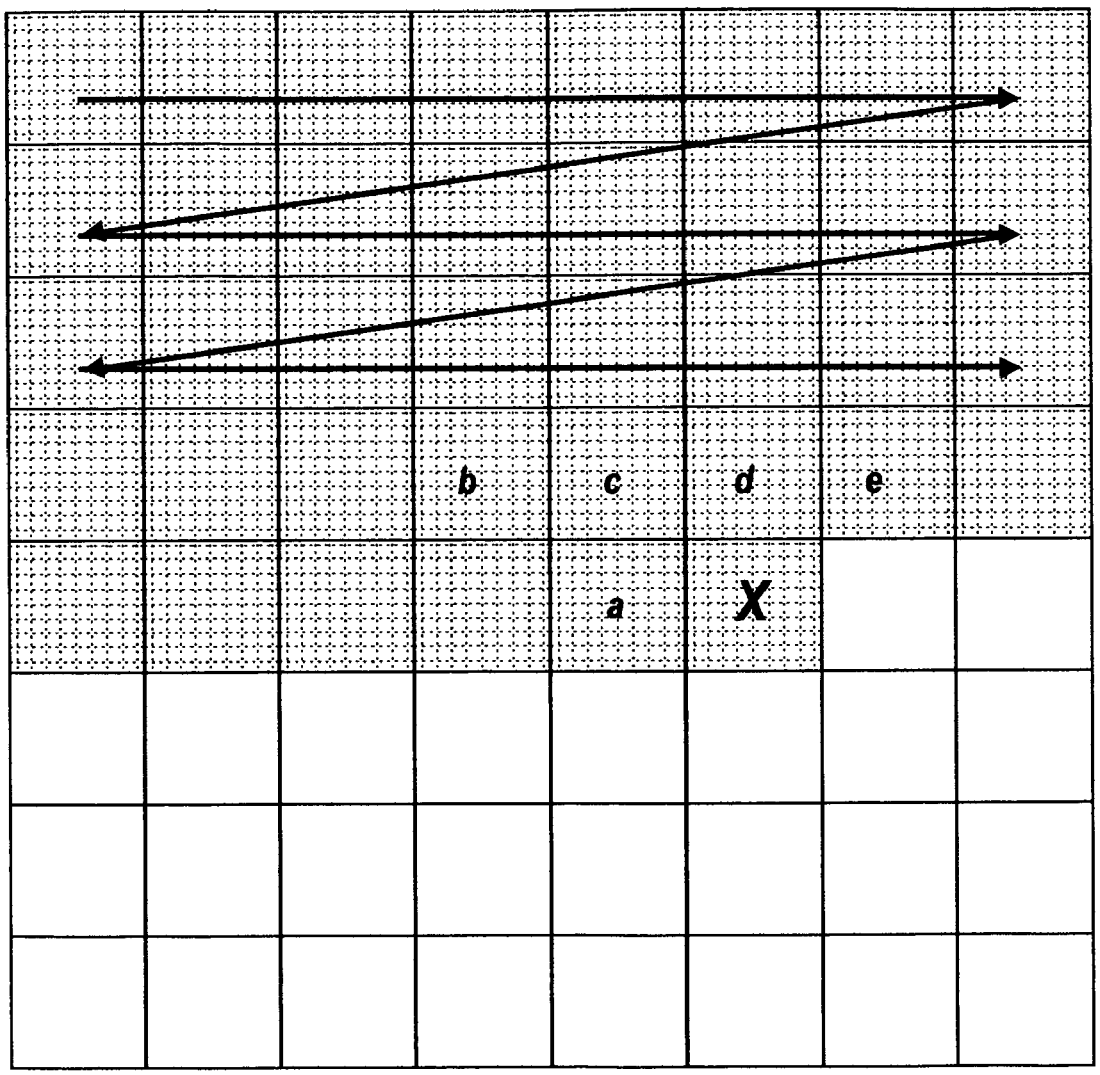
FIGS. 4 and 5 show examples of block scanning orders used in the method shown in FIG. 3.

One example of a block scanning order is the raster scanning order as shown in FIG. 4. In this example, the blocks are scanned from left to right, and from top to bottom. The motion estimation is performed first for the block in the upper left corner and continues left to right for each block in the first row. Then, motion estimation is performed for the blocks in the second row, beginning with the first block on the left side. The estimation continues in this left to right, top to bottom approach until all of the blocks in the target image have been processed. This approach is called a left to right, top to bottom scanning order (or raster scanning order).

In the example shown in FIG. 4, the shaded blocks have been processed by the motion estimation method, and therefore have motion vectors. The motion estimation has yet to be performed for the unshaded blocks. Thus, for a particular block $B_{i,j}=X$, which is the next block to be processed by the motion estimation method, its set of preceding neighboring blocks contains all of the shaded blocks. However, the set of preceding neighboring blocks can be defined as a subset of all of the preceding blocks. For example, blocks a to e can be selected as the set of preceding neighboring blocks of $B_{i,j}=X$, i.e., $P_{i,j}=[a, b, c, d, e]$, which are used to adjust the motion search range in target block X.

Although a left to right scanning order is used in this example, the scanning order of the blocks can be arbitrary. The type of scanning order used determines which neighboring blocks have received motion estimation results earlier than the target block. Those blocks, at least some of which act as preceding neighboring blocks, are used by the adaptive method to adjust the motion search range for the target block.

Figure 5:
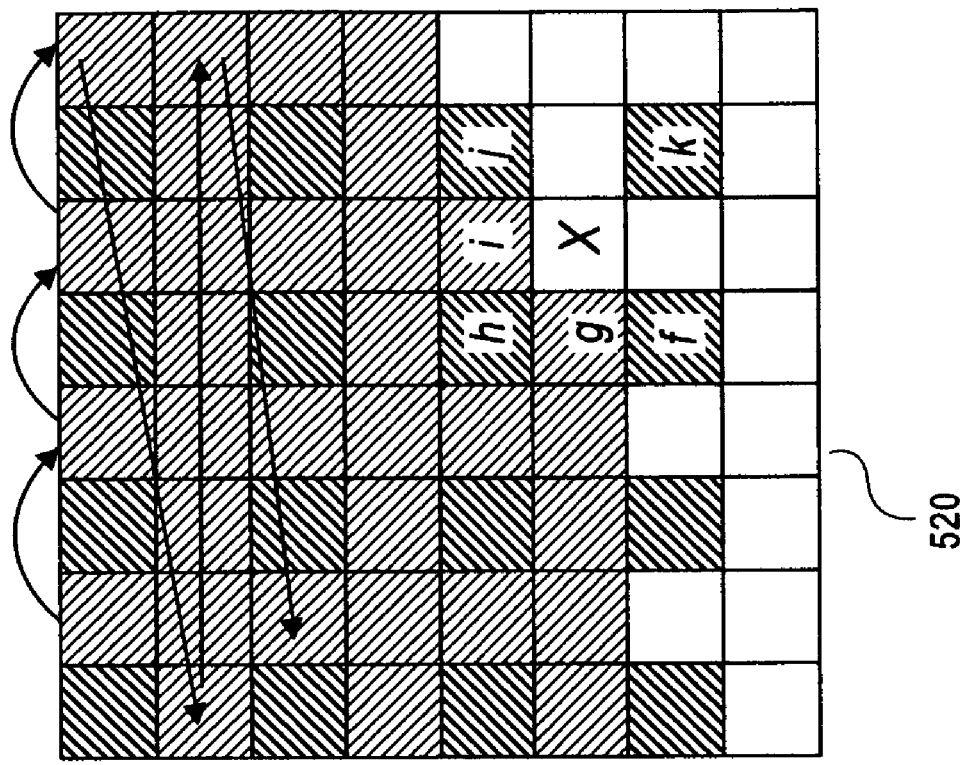
Figure 5:
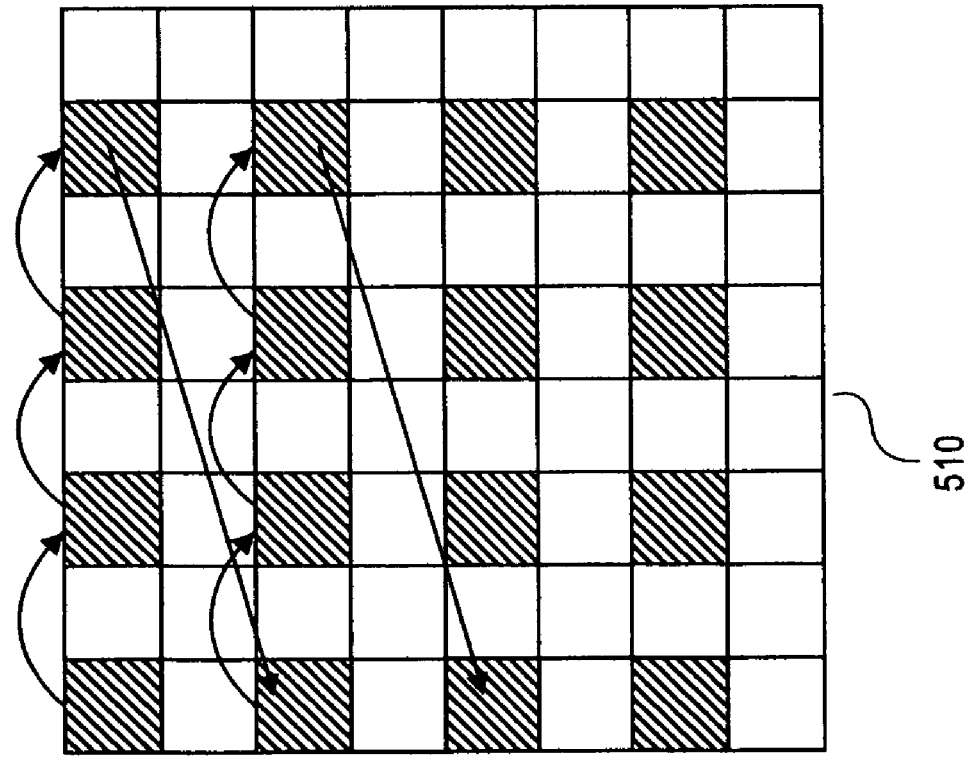

Another example of a block scanning order is a sub-sampling scanning order as shown in FIG. 5. Every other block is scanned in a first round, from left to right and top to bottom, as shown by the shaded blocks in illustrative target image 510. The scanned blocks in this round are sub-sampled from all of the blocks in the target image. Then, during a second round of scanning, the remaining blocks are scanned, as shown in illustrative target image 520.

One advantage of this sub-sampling scheme is that the blocks scanned in the second round may have preceding neighboring blocks in all directions, instead of only the upper and left directions as shown in FIG. 4. For example, block X in 520 can have blocks f, g, h, i, j, and k as preceding neighboring blocks. Thus, while blocks a and f are preceding neighboring blocks to target block X using the sub-sampling scanning order, blocks a and f would not be preceding neighboring blocks using the raster scanning order. This sub-sampling scanning order can lead to an improvement in obtaining values of estimated motion range ($\widehat{mx}_{i,j}, \widehat{my}_{i,j}$) and adjustment values ($\delta_x, \delta_y$).

Figure 6:
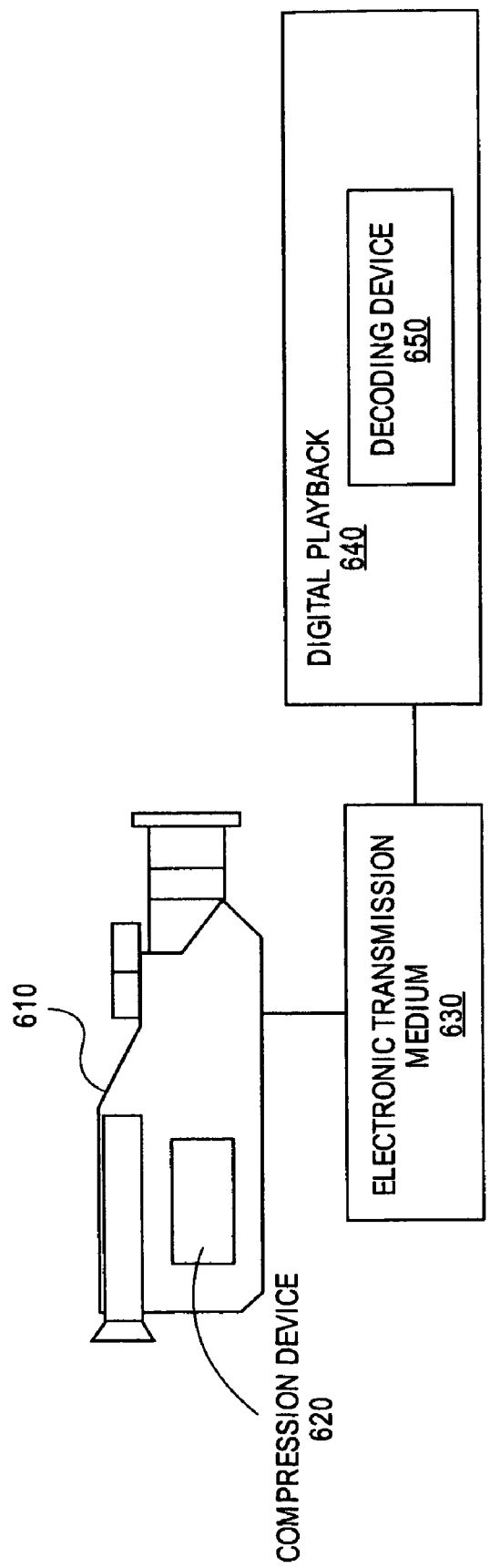
FIG. 6 shows an example of a system that uses the adaptive motion search range method.

FIG. 6 shows an example of a system that uses the adaptive motion search range method. A digital video camera 610 captures images in an electronic form, and processes the images using compression device 620, which implements the adaptive motion search range method during the compression and encoding process. The encoded images are sent over an electronic transmission medium 630 to digital playback device 640. The images are decoded by decoding device 650, which uses the method during the decoding process. Camera 610 is illustrative of various image processing apparatuses (e.g., other image capture devices, image editors, image processors, personal and commercial computing platforms, etc.) that include embodiments of the invention. Likewise, decoding device 650 is illustrative of various devices that decode image data.

While the invention is described in terms of illustrative embodiments in a specific system environment, those of ordinary skill in the art will recognize that the invention can be practiced in various ways in other and different hardware and software environments within the spirit and scope of the appended claims.

The invention claimed is:

1. A method carried out by an electronic data processor, comprising:
   calculating motion vectors for blocks of pixels in a target image;
   applying a high pass filter to the calculated motion vectors to determine a variance of the calculated motion vectors;
   generating a search range associated with a target block of pixels in the target image using the variance of the calculated motion vectors;
   calculating a safety margin for the search range based on motion vectors of at least one preceding neighboring block of pixels;
   expanding the search range using the safety margin; and
   using the generated search range to estimate motion of the target block of pixels.

2. The method of claim 1, further comprising:
   determining a block scanner order for the blocks in the target image selected from the group consisting of: a raster scanning order and a sub-sampling order.

3. The method of claim 1, wherein calculating motion vectors for blocks of pixels in the target image comprises:
   calculating the motion vectors using multiple reference images.

4. The method of claim 1, wherein calculating the safety margin comprises using a standard deviation of motion vectors of the at least one preceding block of pixels to calculate the safety margin.

5. The method of claim 1, wherein generating the search range comprises:
   using the calculated motion vectors to determine an estimated motion range.

6. The method of claim 5, wherein determining the estimated motion range comprises:
   applying a low pass filter to the calculated motion vectors.

7. The method of claim 6, wherein applying the filter to the calculated motion vectors comprises:

$$\widehat{mx}_{i,j}=L\times(M_x)^T, \widehat{my}_{i,j}=L\times(M_y)^T,$$

where L is a filter having n taps, such that L=[l1, l2, ..., ln], and li is the filter coefficient of tap i; $\widehat{mx}_{i,j}$ is the x-axis value of the estimated motion range of the target block; $M_x$ is a vector containing x-axis values of the calculated motion vectors; $(M_x)^T$ is a transpose of vector $M_x$; $\widehat{my}_{i,j}$ is the y-axis value of the estimated motion range of the target block; $M_y$ is a vector containing y-axis calculated motion vectors; and $(M_y)^T$ is a transpose of vector $M_y$.

8. An apparatus comprising:
   a motion vector calculator that calculates motion vectors for blocks of pixels in a target image;
   a search range calculator that uses the calculated motion vectors to generate a search range associated with a target block of pixels in the target image, wherein the search range is calculated by determining a variance of the calculated motion vectors and wherein the variance is determined by applying a high pass filter to the calculated motion vectors;

a safety margin calculator that uses motion vectors of at least one preceding neighboring block of pixels to calculate a safety margin for the search range;

a safety margin applicator that expands the search range using the safety margin; and a motion estimator that uses the generated search range to estimate motion of the target blocks of pixels.

9. The apparatus of claim 8, wherein the blocks in the target image are scanned in a raster scanning order or a sub-sampling order.

10. The apparatus of claim 8, wherein the motion vector calculator calculates the motion vectors using multiple reference images.

11. The apparatus of claim 8, wherein the safety margin calculator uses a standard deviation of motion vectors of the at least one preceding block of pixels to calculate the safety margin.

12. The apparatus of claim 8, wherein the search range calculator uses the calculated motion vectors to determine an estimated motion range.

13. The apparatus of claim 12, wherein the search range calculator applies a low pass filter to the calculated motion vectors.

14. The apparatus of claim 13, wherein the search range calculator applies $$\widehat{mx}_{i,j}=L\times(M_x)^T, \widehat{my}_{i,j}=L\times(M_y)^T,$$

where L is a filter having n taps, such that $L=[l_1, l_2, \ldots, l_n]$, and $l_i$ is the filter coefficient of tap i; $\widehat{mx}_{i,j}$ is the x-axis value of the estimated motion range of the target block; $M_x$ is a vector containing x-axis values of the calculated motion vectors; $(M_x)^T$ is a transpose of vector $M_x$; $\widehat{my}_{i,j}$ is the y-axis value of the estimated motion range of the target block; $M_y$ is a vector containing y-axis values of the calculated motion vectors; and $(M_y)^T$ is a transpose of vector $M_y$.

15. A non-transitory computer readable medium storing a program of instructions which, when executed by a processing system, cause the system to perform a method comprising:

calculating motion vectors for blocks of pixels in a target image;

applying a high pass filter to the calculated motion vectors to determine a variance of the calculated motion vectors;

generating a search range associated with a target block of pixels in the target image using the variance of the calculated motion vectors;

calculating a safety margin for the search range based on motion vectors of at least one preceding neighboring block of pixels;

expanding the search range using the safety margin; and using the generated search range to estimate motion of the target block of pixels.

16. The non-transitory computer readable medium of claim 15, further comprising:

determining a block scanning order for the blocks in the target image selected from the group consisting of: a raster scanning order and a sub-sampling order.

17. The non-transitory computer readable medium of claim 15, wherein calculating motion vectors for block of pixels in the target image comprises:

calculating the motion vectors using multiple reference images.

18. The non-transitory computer readable medium of claim 15, wherein calculating the safety margin comprises using a standard deviation of motion vectors of the at least one preceding block of pixels to calculate the safety margin.

19. The non-transitory computer readable medium of claim 15, wherein generating the search range comprises:

using the calculated motion vectors to determine an estimated motion range.

20. The non-transitory computer readable medium of claim 19, wherein determining the estimated motion range comprises:

applying a low pass filter to the calculated motion vectors.

21. The non-transitory computer readable medium of claim 20, wherein applying the filter to the calculated motion vectors comprises:

$$\widehat{mx}_{i,j}=L\times(M_x)^T, \widehat{my}_{i,j}=L\times(M_y)^T,$$

where L is a filter having n taps, such that $L=[l_1, l_2, \ldots, l_n]$, and $l_i$ is the filter coefficient of tap i; $\widehat{mx}_{i,j}$ is the x-axis value of the estimated motion range of the target block; $M_x$ is a vector containing x-axis values of the calculated motion vectors; $(M_x)^T$ is a transpose of vector $M_x$; $\widehat{my}_{i,j}$ is the y-axis value of the estimated motion range of the target block; $M_y$ is a vector containing y-axis values of the calculated motion vectors; and $(M_y)^T$ is a transpose of vector $M_y$.

* * * * *